P. H. JOHNS.
MANURE LOADER.
APPLICATION FILED JUNE 22, 1918.

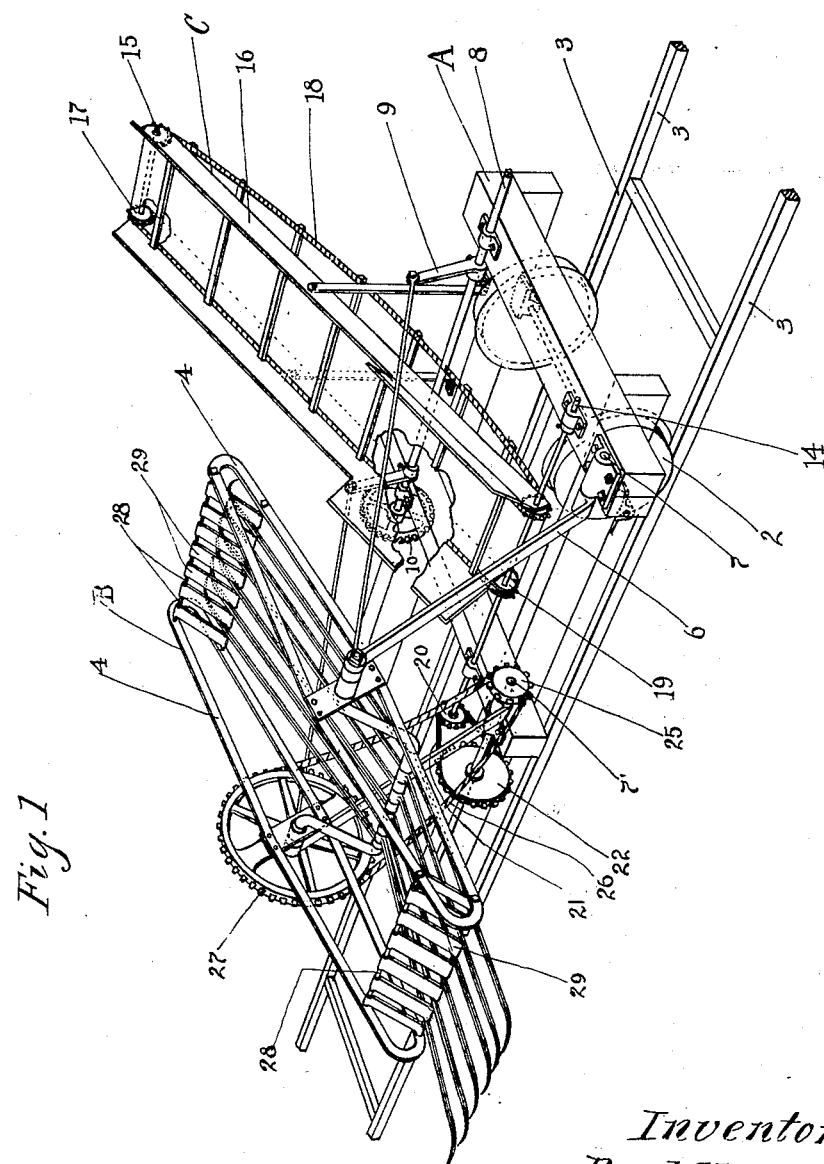

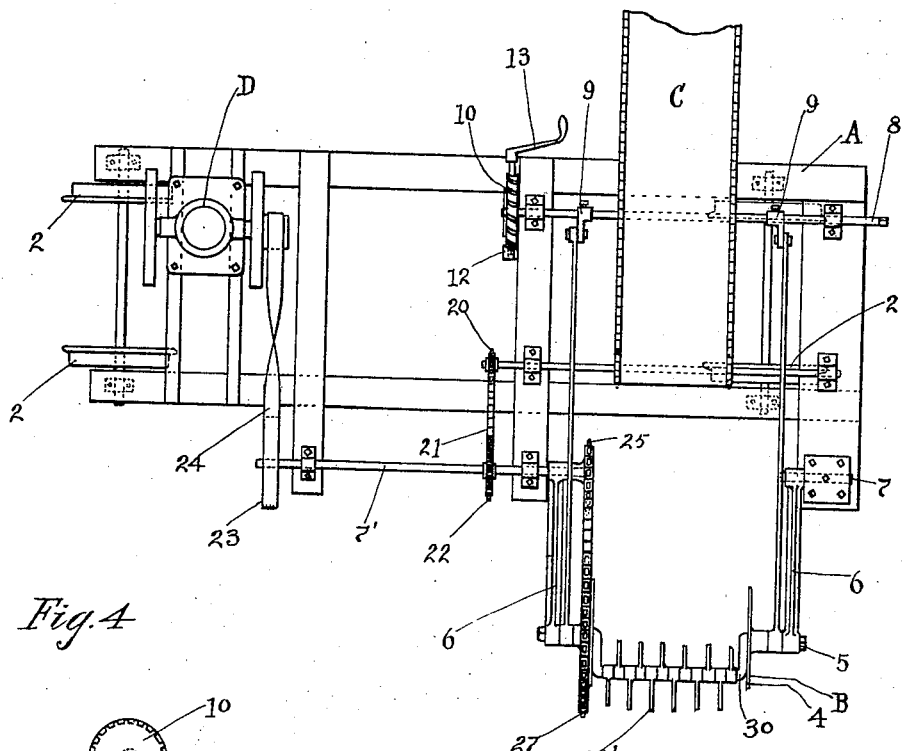
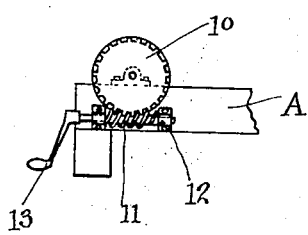
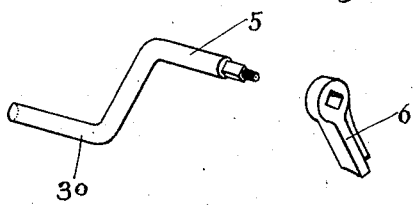

1,313,297.

Patented Aug. 19, 1919.
3 SHEETS—SHEET 3.

Inventor,
Paul H. Johns
his Attorney.

UNITED STATES PATENT OFFICE.

PAUL H. JOHNS, OF UTICA, MINNESOTA, ASSIGNOR OF ONE-FOURTH TO FRED JOHNSON AND ONE-FOURTH TO A. W. COWLES, BOTH OF UTICA, MINNESOTA, AND ONE-FOURTH TO E. W. MORGAN, OF WINONA, MINNESOTA.

MANURE-LOADER.

1,313,297. Specification of Letters Patent. Patented Aug. 19, 1919.

Application filed June 22, 1918. Serial No. 241,363.

*To all whom it may concern:*

Be it known that I, PAUL H. JOHNS, a citizen of the United States, residing at Utica, in the county of Winona and State of Minnesota, have invented certain new and useful Improvements in Manure-Loaders, of which the following is a specification:

This invention relates to improvements in manure loaders and has for its object to provide power driven loading means which may be conveniently moved from place to place and which is simple in construction and light in weight.

A further object is to provide a device that may be used on uneven ground, and may be readily adjusted to meet varying conditions commonly met with where live stock is housed.

More particularly the invention consists in the construction, combination and arrangement of parts hereinafter described and claimed.

Figure 3:
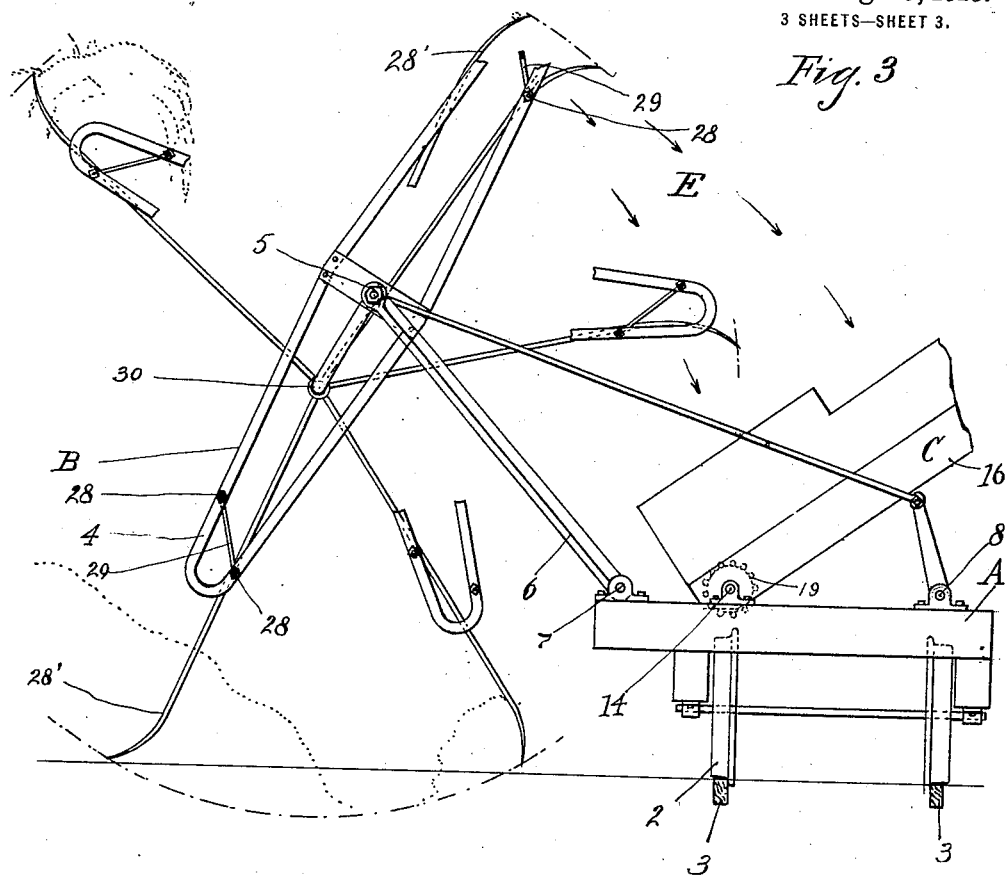
Figure 7:
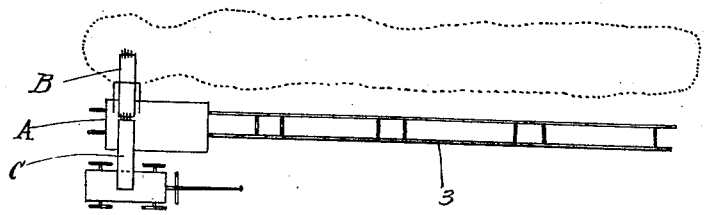

Figure 1 is a perspective view of the invention, the power supplying element not being shown, Fig. 2 is a plan view of the invention, Fig. 3 is a side elevation of the rotary elevator partly diagrammatic to show its successive positions, Fig. 4 is a side view of a detail, Figs. 5 and 6 are perspective views of details, Fig. 7 is a diagrammatic plan showing in minature the use of the invention as applied to an elongated pile of manure.

Referring to the drawings (Fig. 1) A is a frame of a manure loader, B is a rotary scoop or fork swingingly mounted above one side of the frame and C is an inclined elevator conveyor between the frame and the fork. D represents an engine of any suitable type operatively connected with the scoop and elevator to actuate them.

The frame A is mounted on wheels 2 rolling on rails 3.

The rotary fork B comprises a skeleton frame having side members 4 journaled on the crank shaft 5, said crank shaft being rigidly mounted with its ends in the outer end of the strut 6 which is pivotally mounted at its lower ends on the shafts 7 and 7' held respectively rigidly and rotatably on the frame A.

Parallel with the shafts 7 and 7' and rotatably held in the frame A and along the rear edge thereof is the shaft 8. Set-screwed on the shaft 8 and projecting upwardly are the lever arms 9 pivotally connected at their outer ends by rods with the outer ends of the struts 6.

On the shaft 8 is the worm wheel 10 meshing with the worm 11 journaled in the blocks 12 on the frame A. A crank handle 13 rigidly mounted on the shaft of the worm is provided for rotating the worm wheel 10 manually and thereby cause the strut 6 to rotate about the shafts 7 and 7' for the purpose of moving bodily through an arc the rotary scoop B.

In parallelism with the shafts 7 and 7' and 8 and between them and rotatably journaled in the frame A is the shaft 14 whereon is supported the lower end of the elevator conveyer C. The elevator conveyer is inclined rearwardly and upwardly and comprises a horizontal shaft 15 journaled at the top of its frame 16 and carrying a pair of sprockets 17 meshing with the sprocket chain 18, which in turn meshes with the sprocket gears 19 rigidly mounted on the shaft 14.

A sprocket wheel 20 rigidly carried by the shaft 14 at its inner end and meshing with the sprocket chain 21 which in turn meshes with the gear 22 rigidly carried on the shaft 7' serves to actuate the elevator through the medium of the pulley 23 mounted on the outer end of the shaft 7'.

The pulley 23 is connected by means of a twisted belt 24 with the engine D, so that when the latter is actuated the elevator conveyer will be rendered operative to elevate and discharge at its upper end the material as it falls from the rotary scoop. The rotary fork B is operatively connected with the engine as follows:

Carried rigidly on the shaft 7' at its inner end is the sprocket wheel 25 meshing with the sprocket chain 26 which in turn meshes with the sprocket wheel 27 rigidly secured on one of the side members 4 of the rotary fork so that when the engine is actuated the fork will be caused to rotate about its pivots in the ends of the struts 6, the fork overhanging one side of the frame A.

The side members 4 of the fork B are connected at their outer ends by a pair of laterally disposed tie bolts 28, said tie bolts being attached to said members at different distances from the center thereof so that a line between them will form an angle relative to the longitudinal axis of said side members.

A plurality of spacing straps 29 strung in spaced position on each pair of said tie bolts form open work inclined bottoms at the outer ends of the fork to be hereinafter explained.

The crank shaft 5 comprises an offset crank portion 30 whereon are journaled side by side at their inner ends a plurality of tines or fingers 28', each thereof projecting alternately in opposite directions and passing with their forward ends through the spaces between the spacing straps 29 and between the tie rods 28 and operating loosely within said space.

The tines 28' are pointed and curved upwardly at their outer ends to facilitate the scooping up of the material as they are rotated about the crank portion 30 of the crank shaft 5. The crank shaft 5 projects relative to the strut 6 in a downwardly and forwardly direction and has a comparatively long throw, which causes the tines (when the frame 4 is rotated) to reciprocate relative to the frame.

Owing to the downwardly and forwardly projecting position of the crank shaft, the tines are caused to be projected forwardly in the lower half of its path of travel and to recede in the upper half thereof.

This reciprocatory action relative to the frame 4 (as indicated in Fig. 3) serves to facilitate the gathering of the manure as the tines are projected from the frame and to discharge the same as the tines recede into it in the upper half of its path of travel, the manure being thrown forward as indicated by the arrows by the weight of the tines as indicated at E, the tines falling and moving forward in their rearward and downward movement during the rotation of the frame. This tends to clear the discharging end of the fork of any adhering material preparatory to the repeating of its movement.

The machine may be moved over the rails 3 as the material is removed, the material having been previously deposited to form an elongated pile.

The track may be moved forwardly as often as is necessary until the material is removed.

I claim:

1. In a manure loader, the combination with a frame, of a rotary fork adjustably mounted on the frame said fork comprising a housing pivotally supporting a plurality of outwardly extending tines, each tine being free to move independently by gravitation at its outer end in the direction of rotation of the fork, an elevator conveyer between said fork and said frame, and means for actuating said fork and elevator conveyer.

2. In a manure loader, the combination with its frame, of a rotary fork on said frame, comprising a skeleton frame, tines pivotally held on said frame and reciprocatorally held in said skeleton frame and moving therewith to cause said tines to reciprocate concurrently with the movement of said skeleton frame, and means for actuating said rotary fork.

In testimony whereof I affix my signature in presence of two witnesses.

PAUL H. JOHNS.

Witnesses:
WALTER A. SCHWIEDER,
ARTHUR W. COWLES.

Copies of this patent may be obtained for five cents each, by addressing the "Commissioner of Patents, Washington, D. C."